Nov. 18, 1924.
D. W. HUNTINGTON, JR
AIRCRAFT
Filed April 14, 1921
1,516,295
4 Sheets-Sheet 1
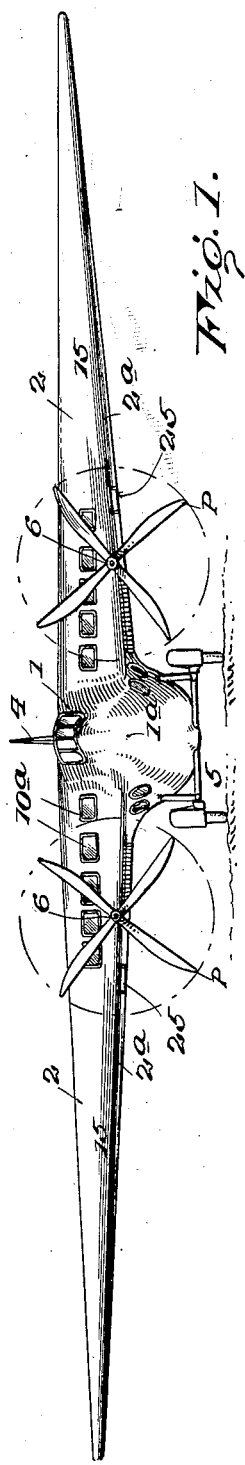
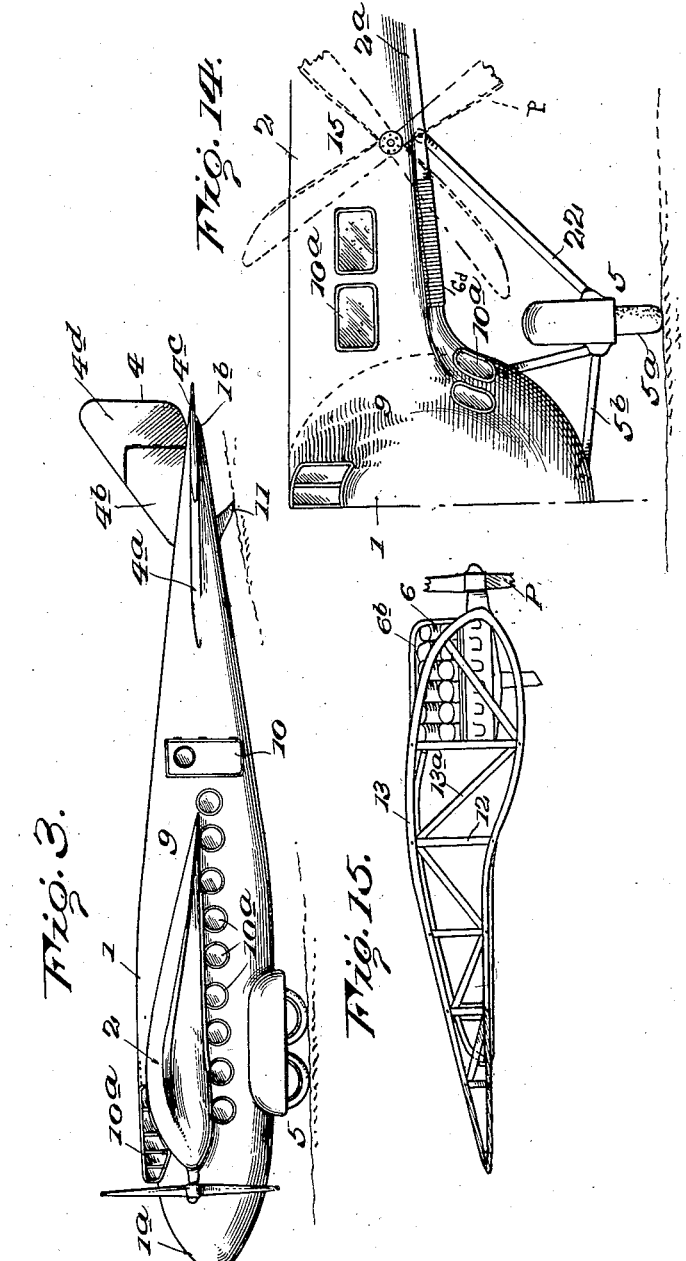
Dwight W. Huntington, Jr. INVENTOR.
BY
ATTORNEY.

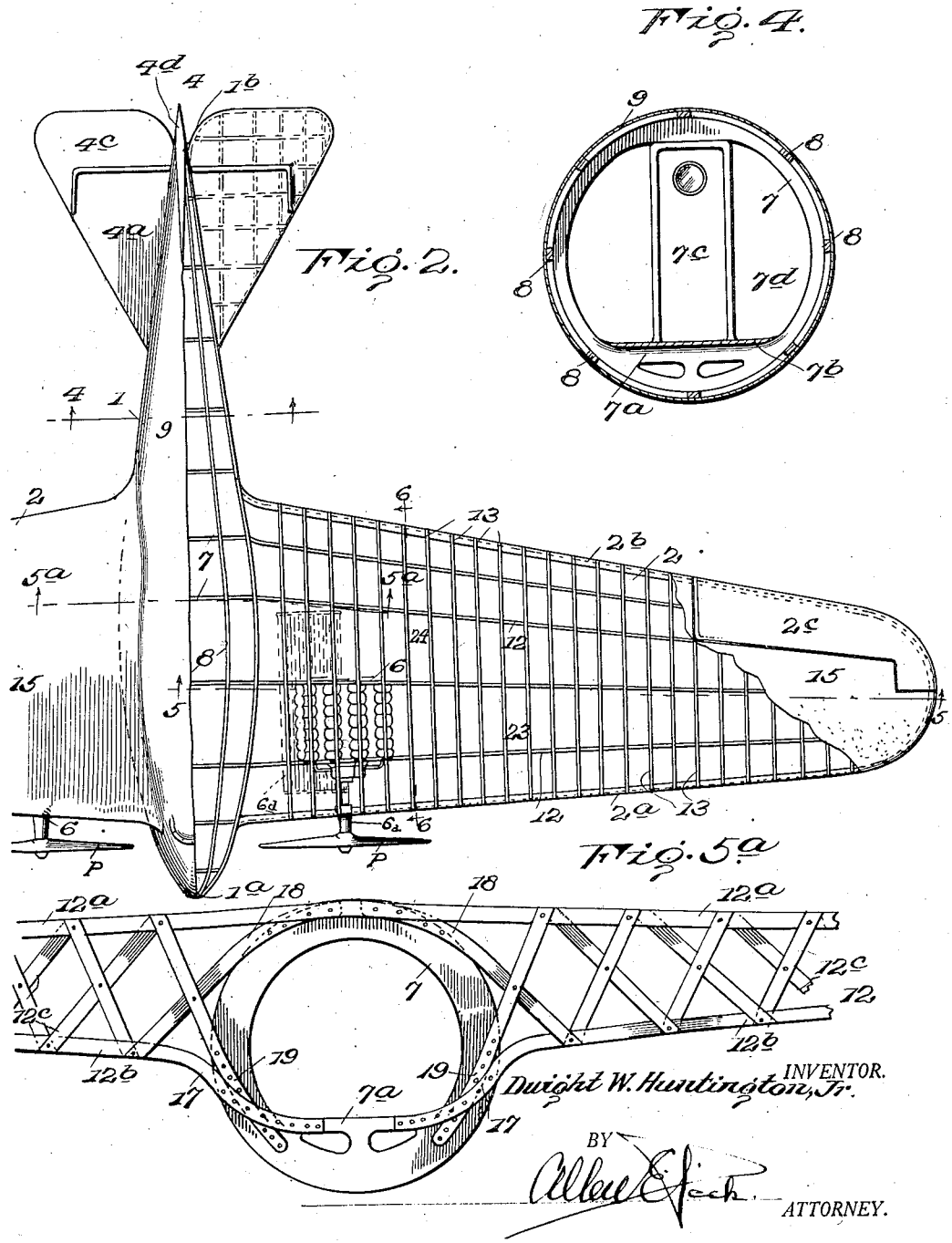

Nov. 18, 1924.

D. W. HUNTINGTON, JR 1,516,295

AIRCRAFT

Filed April 14, 1921     4 Sheets-Sheet 3

Dwight W. Huntington, Jr. INVENTOR.

BY Allen E. Peck ATTORNEY.

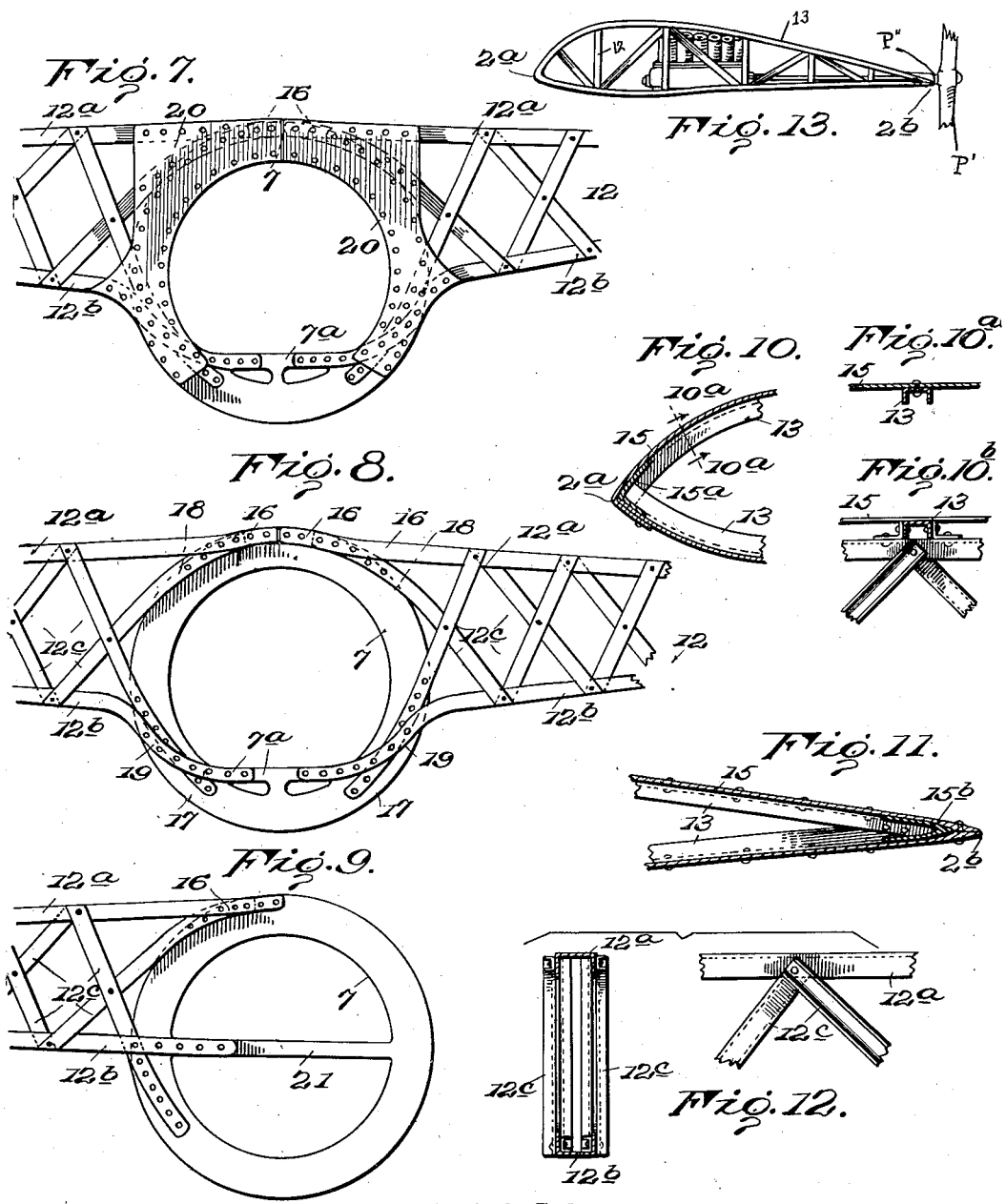

Patented Nov. 18, 1924.

1,516,295

UNITED STATES PATENT OFFICE.

DWIGHT W. HUNTINGTON, JR., OF HEMPSTEAD, LONG ISLAND, NEW YORK.

AIRCRAFT.

Application filed April 14, 1921. Serial No. 461,183.

*To all whom it may concern:*

Be it known that I, DWIGHT W. HUNTINGTON, Jr., a citizen of the United States of America, and a resident of Hempstead, Long Island, Nassau County, State of New York, have invented certain new and useful Improvements in Aircraft, of which the following is a specification.

This invention relates to certain improvements in aircraft; and the nature and objects of the invention will be readily understood by those skilled in the art in the light of the following explanation of the accompanying drawings illustrating what I now believe to be the preferred embodiments or mechanical expressions of my invention from among other forms, constructions and arrangements and combinations within the spirit and scope thereof.

The present invention has particular reference to the construction and arrangement of the body or fuselage and supporting surfaces of air planes, and to the disposition and mounting of the source of power and propulsion therefor. As well known and understood by those skilled in the art to which this invention relates, the existence of so-called head resistance in airplanes is a serious difficulty and disadvantage which must be overcome, or at least materially reduced, to attain any degree of performance approaching perfection, of which such craft are capable.

This head resistance in airplanes results from the presence in the structure of exposed elements which, with respect to the object and function of the supporting surfaces, may be aptly termed "parasite" elements, that is, these elements perform no material supporting or lifting function in flight but present exposed surfaces which offer resistance to passage through the air, thus materially reducing the speed, maneuverability, and performance generally of such craft. The resistance offered by these "parasite" elements is termed head resistance and results in the main, from the exposed exterior bracing and trussing of the structure, the body or fuselage, the undercarriage, and the source of power and propulsion.

One of the objects of the present invention is the reduction of head resistance in airplanes, and this object is attained by a construction and arrangement of major units which practically eliminates the exterior bracing and trussing, which permits of a disposition and mounting of the source of power and propulsion within, and substantially enclosed by, the supporting surfaces, which permits the use of a body or fuselage of pure stream line form and a material reduction in exposed under carriage surfaces, thereby providing an airplane structure in which the main resistance creating elements are practically eliminated, with the result that head resistance in an airplane embodying the present invention is reduced to a minimum.

The invention contemplates the use of supporting surfaces of the internally braced type and provides supporting surfaces which are internally braced to carry both flying and landing loads and in which exterior bracing may be completely eliminated. The manner of mounting and securing the supporting surfaces to the body or fuselage constitutes one of the main features of the present invention and through the use of the supporting surfaces constructed and mounted in accordance with the invention it becomes possible to provide a body or fuselage of pure stream line form and to secure in the completed airplane embodying the constructions and arrangements of the invention, the centers of gravity, thrust, resistance and lift more nearly coinciding than possible with prevailing forms of the general type of the present invention.

A further feature of the invention resides in the disposition and mounting of the source of power within and substantially enclosed by the supporting surfaces thereby eliminating the head resistance created by such source when mounted in partially or completely exposed positions, in accordance with the prevailing practice. The foregoing feature is of particular value in airplanes provided with multiple sources of power which multiple sources have been heretofore mounted in completely exposed positions with the resulting material increase in head resistance of the airplane.

Other features and objects will appear from the following detailed description of the accompanying drawings in which I have illustrated one form and adaptation of my invention.

Referring to the accompanying drawings:—

Fig. 1 is a front elevation of an airplane embodying the features of the present invention.

Fig. 2 is a top plan view of the embodiment of Fig. 1, with a portion of the upper covering of a wing removed to show, more or less diagrammatically, an arrangement of internal wing bracing and a power unit mounted within the wing in accordance with the invention.

Fig. 3 is a side elevation of the embodiment shown in Fig. 1.

Fig. 3ª is a vertical longitudinal section through the body or fuselage of the embodiment shown in Fig. 3.

Fig. 4 is a vertical section through the body or fuselage on the line 4—4, of Fig. 2.

Fig. 5 is a vertical section taken longitudinally through a wing along the line 5—5, of Fig. 2, and showing more or less diagrammatically one of the wing spars.

Fig. 5ª is a more or less diagrammatical view of a body or fuselage bulkhead and wing spars, showing one manner of mounting and securing the wings to the body.

Fig. 6 is a vertical transverse section through a wing taken on the line 6—6, of Fig. 2 and showing more or less diagrammatically a power unit mounted within and enclosed by the wing, and further showing a form of wing rib.

Figs. 7 and 8 are more or less diagrammatical views similar to Fig. 5ª, and showing portions of a body or fuselage frame and different manners and arrangements of mounting and securing the wings thereon.

Fig. 9 is a view similar to Figs. 7 and 8, more or less diagrammatical, and showing a body or fuselage frame and the manner of mounting and securing the wings thereon.

Figs. 10, 10ª, 10ᵇ, 11 and 12 are detail views of a form of wing construction, showing sections through the leading edge, trailing edge and wing spars, and one manner of applying the covering or skin to the wings.

Fig. 13, is a vertical transverse section through a wing, showing more or less diagrammatically a power unit mounted in and enclosed by the wing, and further showing an arrangement and manner of mounting a shaft and propeller of the "pusher" type with the power unit.

Fig. 14 is a detail view in front elevation and having portions broken away, more or less diagrammatical; of a portion of the body, undercarriage, and wing of an airplane embodying the present invention, and showing a construction and arrangement of exterior bracing for the wing mounted power units and a manner of mounting the undercarriage on the fuselage frame.

Fig. 15, is a vertical, transverse section through a wing, showing more or less diagrammatically a manner of mounting a power unit within the wing and partially enclosed thereby.

The use in airplanes of multiple sources of power and propulsion, hereinafter referred to as "power units", which latter term is intended to define and include all types and manner of means adapted to create and supply power for the propulsion (motors, jet propulsion, etc.) of aircraft, has been limited to structures of the multiple supporting surface type (biplanes, triplanes, etc.).

Heretofore, due to a number of reasons obvious to those skilled in the art, the use of multiple power units in airplanes of existing monoplane types, has not been practical.

The development of commercial uses for the airplane has created a demand for large craft of great useful load capacity, low operating cost and reliability of operation, and aerodynamically and structurally the monoplane type meets these several commercial requirements. However, with the requirements for increased size, useful load capacity, and reliability of operation the problem of correspondingly increasing the power and flexibility of such craft arose and the present invention, by the use of an improved construction of supporting surfaces and the manner of mounting and securing the same to a body or fuselage, solved the problem above referred to, by permitting the successful use in an airplane having a main supporting surface (monoplane) of multiple power units. Therefore, the present invention is particularly adapted to the construction and arrangements of major units of airplanes of the monoplane (main supporting surface) type, although it is to be clearly understood that the several constructions, details and arrangements embodied in the invention are capable of an application and use to and in aircraft generally.

The airplane embodying the invention, illustrated in the accompanying drawings, is constructed of metal throughout, such for example, as duraluminum, although I do not desire to limit the invention to the use of a metal construction as any suitable or desired material may be utilized without in any manner departing from the spirit and scope of the invention.

Referring to the accompanying drawings, wherein I have more or less diagrammatically illustrated the several features of my invention embodied in and providing an airplane of the monoplane type, constructed of metal throughout, and comprising a body or fuselage 1, the main supporting surface or wings 2, the empennage 4, undercarriage 5, and multiple power units 6.

The fuselage 1 is of pure stream line form, circular in cross section, and comprises a series of circular bulkheads 7, parallel and spaced apart, and of varying diameters to create the tapering stream line form of the completed fuselage. A series of longitudinal members or longerons 8 extend fore and aft across and secured to the series of bulkheads 7, maintaining the same in spaced relation, and converging at their forward ends to form the nose 1ª of the fuselage and converging at their rear ends to form the tail end 1ᵇ of the fuselage. The series of circular bulkheads 7 and the series of longerons 8 are rigidly secured together and provide the frame structure upon which any suitable skin or covering 9 is secured to present a smooth, unbroken exterior surface which will reduce skin friction to a minimum. In this instance, the skin 9 is formed of thin sheets of metal which are preferably secured longitudinally along and over the longerons 8, that is, these metal sheets extend fore and aft over the fuselage frame with their joined edges extending longitudinally of the fuselage. This manner of securing the skin 9 on the fuselage materially reduces the resistance created by skin friction.

The series of bulkheads 7 in the particular example illustrated, are circular in exterior form or edge contour, although any desired shape or form may be utilized. The stream line, tapering shape of the body or fuselage 1, is formed by providing the series of spaced circular bulkheads 7 which decrease in diameter forwardly and rearwardly from a portion of the fuselage forward of the longitudinal center of the body, the point of greatest diameter. Each bulkhead 7 is formed centrally open and provided with a transverse web 7ª extending across the interior between opposite sides thereof. With the bulkheads 7 in position in the body 1, the webs 7ª are located across the lower portions thereof, respectively, and provide interior transverse beams upon which a suitable deck 7ᵇ is secured. The interior of the body 1 may be divided into any desired arrangement of compartments, passageways and the like, by suitable partitions and doors.

In Fig. 4, I show one of the bulkheads 7 provided with and closed by a metal partition 7ᵇ having a door 7ᶜ mounted therein to provide for passage therethrough.

The body 1 is provided with side openings through the skin or covering 9 for entrance and exit to and from the interior of the body and these openings are closed by doors, or the like 10. Windows or ports 10ª are provided in the body for the crew and passengers and any desired or suitable arrangement of such ports or windows may be provided to give the necessary range of vision to the pilot.

The body or fuselage 1 has the usual empennage 4, which in the example illustrated, is of conventional type, mounted on the rear or tail portion thereof, and comprising the horizontal stabilizers 4ª, vertical stabilizer or fin 4ᵇ elevators 4ᶜ and rudder 4ᵈ. It should be noted that the horizontal tail surfaces, stabilizers 4ª and elevators 4ᶜ, are mounted along the central axis of the body 1, as will be more fully explained hereinafter. The rear end of the body 1 and the empennage 4 are supported on the ground by the usual or any desired tail skid 11 in the conventional manner well understood by those skilled in the art.

The embodiment of the invention illustrated herewith is of the monoplane type, as and for reasons hereinbefore referred to, and includes a main supporting surface consisting of the wings extending laterally from opposite sides of the body or fuselage 1, respectively, conforming in the foregoing general respects to the conventional arrangement of supporting surface in the monoplane type. The wings 2 are of the internally braced type, that is, all wing bracing and trussing is located within the body of the wings and exterior braces and trusses are entirely eliminated. Various forms of internally braced wings exist in the art and are in use in monoplane types, and the present invention relates to an improved construction of such type of wing in which exterior trussing is entirely eliminated and which, by means of a peculiar construction and arrangement makes it possible to mount and secure the wings on and to the sides of a body or fuselage in such a manner that the interior of the body or fuselage is not traversed or obstructed in any manner by elements of the wing structures.

Those skilled in the art are conversant with the so-called "high lift" type of aerofoil or supporting surface, one characteristic of which may take the form of an increased depth or thickness in the forward or leading portion of the body of the surface, and in the particular embodiment of the present invention illustrated herewith, I show a monoplane supporting surface of the "high lift", internally braced type, constructed and mounted in accordance with the invention and having that characteristic of increased depth or thickness in the forward or leading portion. However, it is to be understood that I do not wish to limit the invention to the so-called "high lift" type, as it is equally applicable to aerofoils or supporting surfaces of various other forms and types.

In the accompanying drawings, I show the wings 2 provided with suitable control surfaces such as the ailerons 2ᶜ. The wings 2 are similar in all respects and extend laterally from opposite sides of the body 1 and tapering in width from the wing roots to the wing tips, at which point the wings are of considerably less width than at their roots. It will be noted that the rear or trailing edges 2ᵇ of the wings are inclined or tapered forwardly from root to tip at a greater angle than the front or leading edges $2^a$ are inclined or tapered rearwardly from root to tip. Each wing 2 is formed of considerable depth or thickness intermediate the front or leading edge and the longitudinal center, throughout the length of the wing, and decreases in depth or thickness rearwardly to the trailing edge of the wing, so that the leading or front portion of the body of each wing 2 is of greater depth or thickness than the rear or trailing portion of the wing, as clearly shown by Fig. 6 of the accompanying drawings. The wings are further tapered in depth or thickness longitudinally from root to tip throughout their width, that is, the wings are of greatest depth or thickness at the roots and gradually decrease in depth throughout their width toward the tips.

The foregoing shape and form of the wings 2 result from the following construction and arrangement. Each wing 2 comprises a series of longitudinally disposed spars 12 extending throughout the length of the wing and spaced a distance apart from front to rear throughout the width of the wing, between the leading and trailing edges. These spars 12 are each longitudinally tapered from inner end to outer end to provide for the desired wing taper from root to tip, and are of varying heights or depths, those of greatest depth being forward of the longitudinal center of the wing to provide the thickness or depth to the forward portion of the wing body and those in the rear decreasing in depth to provide for the gradual decrease in depth in the wing body rearwardly to the trailing edge.

A series of parallel spaced capstrips 13 are secured transversely across the wing spars, from inner or root ends to outer or tip ends of the spars, and the upper capstrips are arranged across the spars 12 directly above and in the same vertical planes with the lower capstrips, respectively. The capstrips 13 extend forwardly and rearwardly a distance beyond the wing spars 12 and each pair of parallel upper and lower capstrips are converged and secured together at their ends forwardly and rearwardly of the wing spars, thus forming the line of the leading and trailing edges $2^a$ and $2^b$, respectively, of the wings 2. An arrangement of internal trussing is provided between the pairs of upper and lower capstrips 13 and the wing spars 12 which pass transversely therebetween and therethrough. This internal trussing comprises the braces or compression members $13^a$ extending diagonally from the lower capstrip of each pair at the intersections with the lower edges of the wing spars 12, to the upper capstrip thereabove at the intersections with the upper edges of the wing spars 12 adjacent thereto, that is, the compression members $13^a$ extend diagonally from lower capstrip to upper capstrip between adjacent wing spars. In Fig. 6 of the accompanying drawings the arrangement of the compression members $13^a$ is more or less diagrammatically shown. Thus, in effect, the foregoing construction provides a series of spaced, transverse ribs extending from the leading edge $2^a$ of each wing to the trailing edge $2^b$, and comprising the capstrips 13, compression members $13^a$, and the wing spars 12, extending transversely therethrough.

A suitable skin or covering 15 is secured over the upper and lower edges of the wing frame hereinbefore described, and in this particular instance, consists of thin sheets of metal riveted or otherwise secured across the frame to provide a smooth exterior surface completely covering and enclosing the frame and trussing therefor. In this connection, attention is directed to Figs. 10, $10^a$, $10^b$, and 11, in which detail views of one manner of securing skin 15 on the wing frames is shown, and in which a possible construction of leading and trailing edges is also shown. The construction illustrated provides the cap strips 13 in the form of channel bars extending across the wing spars 12 and having the skin 15 riveted or otherwise secured thereto, and held spaced from the spars 12 thereby. The forward ends of the capstrips 13 are converged and secured together as shown in Fig. 10, by a U-shaped leading edge bar $15^a$ extending thereover shown in transverse section and over which the skin 15 is secured to provide the leading edge $2^a$ of the wing. The rear ends of the capstrips 13 are converged and secured together as shown in Fig. 11, by V-shaped trailing edge bar $15^b$ extending thereover, and over which the skin 15 is secured to provide the trailing edge $2^b$.

In the assembled wing comprising the wing spars 12, capstrips 13, compression members $13^a$ and the metal skin or covering 15, the drift stresses to which the wing is subjected in flight are taken by the metal skin 15 with an ample factor of safety for the wing and without the use of conventional drift bracing between the ribs of the wing, thus effecting a saving in material and weight.

The wings 2, constructed as hereinbefore described, are mounted and secured to opposite sides of the stream line form of body or fuselage 1, by flaring the wing roots upwardly and downwardly, respectively, to conform to and fit over the convex surface of the body, so that in effect, the inner or root ends of the wings 2 are formed concave throughout their fore and aft length to embrace and fit over the sides of the circular fore and aft tapered fuselage 1. Preferably, and in the examples illustrated in the accompanying drawings, the wings 2 are mounted on and secured to opposite sides of the airplane body or fuselage substantially along the fore and aft center of the sides thereof with the body of the wings disposed above the center and a distance below the top or extreme upper side of the body. However, it should be noted that the wings may be mounted substantially below the fore and aft center of the fuselage, or at any desired position with respect to the fore and aft center, as it is not desired to limit the invention to the particular position illustrated herewith. The wings are mounted in substantially the above noted position, in such a manner, that the wing stresses are transmitted and distributed from the wing structures to the body or fuselage frame structure as a result of the following construction and arrangement of the wing spars and wing roots.

The wing spars 12 each comprise the upper spar member 12ª and the lower spar member 12ᵇ. The upper and lower spar members are spaced apart and inclined or tapered from their root ends to converge at their tip ends to give the desired shape to the wings, as hereinbefore fully referred to and explained. Interposed between, secured to and connecting the upper and lower spar members 12ª and 12ᵇ, respectively, of each wing spar 12, is a series of compression members 12ᶜ forming a system of bracing or trussing throughout the length of the wing from root to tip. In the particular example illustrated, this system of trussing comprises pairs of crossed compression members, each pair forming an X having the ends thereof secured to the upper and lower spar members, respectively, and to the adjacent ends of the next pair of crossed compression members, in this manner providing wing spars rigidly trussed internally against tension and compression stresses. Fig. 5 of the accompanying drawings, clearly shows the foregoing system of internally trussing and bracing the wing spars 12. It is understood that the invention is not limited to use of the particular form and arrangement of spar members and trussing above referred to, as various other forms and arrangements may be utilized without departing from the spirit and scope of the invention. For example, in Fig. 12 of the drawings, I show a construction of upper and lower spar members 12ª and 12ᵇ, in which the spar members are formed of channel bars with the channeled sides facing inwardly opposite each other and having a series of channel bar compression members 12ᶜ secured between opposite inwardly extending sides of the spar members, respectively, to provide a double truss system in the completed wing spar.

The wings 2 are mounted and secured in position on and to the opposite sides of the body or fuselage 1, through the medium of the inner or root ends of the spar members 12ª and 12ᵇ, and the pair of compression members adjacent to the fuselage, that is the innermost, or wing root compression members which are next to the body or fuselage.

With the wings 2 in position with respect to the body or fuselage 1, the inner or root ends of the wing spars 12 are substantially in line with and adjacent to the respective bulkheads 7 which are included in the sections of the fuselage opposite and adjacent the roots of the wings 2. The upper and lower spar members 12ª and 12ᵇ, of the wing spars 12 in each of the wings 2, are extended to provide the lengths 16 and 17, respectively, included in the wing roots. The upper lengths 16 of the wing spars 12 of each wing are curved slightly upwardly around and conform to the upward curve of the bulkheads 7 adjacent thereto, respectively. In the particular position of the wings illustrated, the upper lengths 16 of the wing spars 12ª are substantially straight, although the effect of the upward curve is provided by the inclination of the spars 12ª downwardly toward the wing tips. Each length 16 is securely riveted or suitably rigidly fastened to the respective adjacent bulkhead 7 of the body or fuselage 1. The lower lengths 17 of the wing spars 12 of each wing, are curved downwardly, in a manner similar to the lengths 16, around and conform to the downward curve of the lower or under sides of the respective bulkheads 7 adjacent thereto, and each length 17 is securely and rigidly riveted, or otherwise suitably fastened to the respective adjacent bulkheads 7 of the body or fuselage 1. When the fuselage bulkheads 7 are provided with the transverse webs 7ª, the lengths 17 may have their ends curved inwardly and secured to these webs, as illustrated in the drawings. In this manner the root ends of the wing spars 12 of the wings 2 extending from opposite sides of the body or fuselage 1 are secured rigidly to the bulkheads of the fuselage located therebetween and adjacent thereto so that the opposite root ends of corresponding wing spars in the oppositely extending wings 2 are secured to opposite sides of the same bulkhead which lies therebetween and adjacent thereto.

The innermost compression members 18 and 19 of the trussing 12ᶜ of each wing spar 12, are likewise extended and rigidly secured along and around portions of the upper and lower sides, respectively, of the bulkheads 7 adjacent to the respective wing spars of which said compression members 18 and 19 are a part. The members 18 and 19 are secured to the respective bulkheads adjacent thereto (either over, or between bulkhead and wing spar member), in the same manner as the spar members of their respective wing spars 12. The arrangement is such that the compression member 18 of the wing spar which is secured to the lower spar member 12$^b$ extends upwardly and is secured to, around and adjacent the length 16 of the upper spar member on the upper or top side of the adjacent bulkhead 7, and the compression member 19 of the wing spar which is secured to the upper spar member, extends downwardly and is secured to, around and adjacent the length 17 of the lower spar member on the lower or bottom side of said adjacent bulkhead 7. Thus each wing 2 is mounted on and secured to the body or fuselage 1 by the upwardly and downwardly flared wing roots which are formed by the extended lengths of the upper and lower spar members of each wing spar and the extended innermost compression members of the wing spars, which extended lengths are curved to substantially conform to the shape or contour of the body or fuselage 1, as defined by the form and contour of the fuselage bulkheads 7, and are rigidly secured upwardly and downwardly to and around the fuselage bulkheads respectively adjacent thereto.

In Figs. 5$^a$, 7, 8 and 9, I show more or less diagrammatically, several arrangements for securing and mounting the wings 2 to and on the body or fuselage 1.

Referring particularly to Fig, 5$^a$ of the drawings, I show the upper spar members 12$^a$ of opposite alined wing spars of the wings 2 formed in a single continuous length extending across and curved upwardly around, and rigidly secured to the adjacent fuselage bulkhead over which it extends. In this form the upper spar members, of opposite alined spars, are each formed in a continuous piece from wing tip to wing tip of the oppositely extending wings and each of such continuous spars fitting over, conforming and secured to, the fuselage bulkhead adjacent thereto, over which it passes. The construction and arrangement of the lower spar members of the respective wing spars are the same as hereinbefore explained, as also is the arrangement of extended innermost compression members of the wing spar trussing. It will be noted in this connection that the extended compression members are secured between the upper and lower spar members, respectively, and the fuselage bulkheads, that is the compression members, are secured directly to the respective bulkheads and the upper continuous spar member is secured to and over the upper compression members and the lower spar members are secured to and over the lower compression members.

The construction and arrangement diagrammatically shown in Fig. 7, are similar to the general construction and arrangement hereinbefore described as shown for example, in Fig. 8, and includes the addition thereto of tie plates, or the like 20, which cover the secured spar members and compression members and are rigidly secured thereover to the bulkhead 7 and the aforesaid secured members.

In Fig. 9, of the drawings, I show more or less diagrammatically, a fuselage bulkhead 7 provided with a diametrically disposed beam 21 extending thereacross and connecting opposite sides thereof. This construction of bulkhead is introduced into the body or fuselage construction to provide for an upper deck above the deck formed therebelow on the webs 7$^a$. The manner of mounting and securing the wings to a body provided with multiple decks so formed consists in securing the extended end of the lower wing spar to and along the beam 21 and the lower end of the compression member 19 extending from the upper spar member 12$^a$ is secured to the bulkhead 7 at its point of intersection or crossing with the lower wing spar member 12$^b$.

The wings 2 mounted as described hereinbefore, are rigidly secured to the body or fuselage 1 without in any manner obstructing the interior thereof. The flared roots curving upwardly and downwardly and merging gradually into the curve and shape of the body, permit the use of a pure stream line form in the body which shape and form is not interrupted by, but in fact continues gradually from the body by the wings without creating surfaces of a nonstream line form. The wing stresses are taken by the internal trussing and bracing and distributed to the wing spars and through the construction described, distributed to the fuselage frame. In flight, for example, the upper spar member will be under compression and the lower spar members under tension and secured to the bulkheads near their points of maximum diameter and these stresses are carried through the spars to the fuselage bulkheads, in fact the effect and result of the construction is that of continuous upper and lower spar members having a central upwardly curved and central downwardly curved portions (the fuselage bulkheads) respectively.

The position and form of the wings 2 on and extending laterally from opposite sides of the body 1, are such that the horizontal tail or empennage surfaces may be mounted along the central axis of the body, with attendant aerodynamic advantages and without being materially effected by the down wash from the wings in flight. The wings 2 are mounted as described, on the upper portions of the body thus creating considerable clearance between the wings and the ground in "taking off" and landing. This fact materially assists in the reduction of the exposed head resistance creating surfaces of the undercarriage 5 by permitting shortening of the axis and truss construction and the placing of the wheels in proximity to the under side of the body. In the accompanying drawings, the undercarriage is more or less diagrammatically disclosed and may be of conventional or any other suitable or desired type. Fig. 14 of the drawings diagrammatically discloses a construction of undercarriage particularly adapted to the present invention, and comprises the axle $5^b$ secured at one end to the lower side of a fuselage bulkhead 7 and the strut $5^c$ secured to the bulkhead 7 below the wing 2 and depending downwardly to and rigidly joined with the axle $5^b$. A wheel $5^a$ of the conventional type is mounted upon the axle $5^b$. Usually it is preferable to provide a similar axle and strut rearwardly and in line with the axle $5^b$ and $5^c$ and if desired to interconnect these axles by any desired strut or truss arrangement. The foregoing construction is duplicated on the opposite side of the fuselage and if desired, the axle $5^a$ may be formed of one continuous piece extending across the fuselage and a distance beyond the opposite sides thereof to receive opposite side wheels $5^a$.

The airplane disclosed and described herewith is of the monoplane type and the present invention includes the provision of multiple power units mounted within and enclosed by the body and skin of the wings. In the particular example illustrated, I show two power units 6 mounted on opposite sides of the body or fuselage 1 and within the oppositely extending wings 2, respectively. These power units 6 are diagrammatically shown as each is composed of two V type motors suitably geared, or otherwise operatively connected, to a tractor propeller drive shaft $6^a$, and these units are mounted within each wing 2 in the forward or leading portion thereof between the two forward wing spars 12 and totally enclosed within the wing, as shown in Figs. 2 and 6 of the drawings. The propeller drive shaft $6^a$ of each unit 6 extends a distance forwardly and beyond the leading edge of the wing and is provided with means for propelling the plane, such for example, as the tractor propeller P. In the embodiment shown in Fig. 15 the power units 6 are mounted in the wings between the leading edges and the most forward wing spars, respectively, and have their forward ends extending above the upper skin or covering of the wings. A stream line cowl $6^b$ is mounted to suitably enclose the end portion of each power unit 6 which extends above the wings. The power unit, as mounted in Fig. 13, is provided with a pusher propeller $P'$ mounted on the rearwardly extending drive shaft $P''$. It is understood of course, that either pusher or tractor propellers may be used with the totally enclosed power unit or with the partially enclosed unit. The power units where they are of the internal combustion motor type, may exhaust through the top rear surface of the wings, as shown by the exhaust line $6^c$ in Fig. 6, and the wings 2 may be provided on their under sides with tubular radiators $6^d$ forming parts of the motor cooling system.

The power units may be entirely enclosed within the wing bodies as clearly shown in Fig. 1 of the accompanying drawings, but in either the totally enclosed mounting or that such as shown in the embodiment of Fig. 15, it is clear that power unit, created head resistance is reduced to the minimum.

The power unit loads are entirely supported by the internal wing trussing and the construction and manner of securing the wing roots to the fuselage frame, so that it is not necessary to add exterior trusses or braces to assist the wing structure in carrying the motor loads and stresses.

I do not desire to limit the invention to any number, type or particular mounting of power units as the invention resides in the mounting of the units within, enclosed by and supported on the wing bodies.

If desired, an external truss 22 may be provided from the wings adjacent the motors directly to opposite sides of the undercarriage, respectively, as more or less diagrammatically shown in Fig. 14 of the drawings. This exterior truss will transmit the motor loads directly to the undercarriage structure thereby relieving the wing and body structure, and is particularly used in transmitting excessive landing loads. However, the invention is not limited to the use of such exterior motor trussing.

Although I have shown and described the illustrated embodiment of the invention as provided with multiple power units, attention is directed to the fact that the other features and constructions of the invention are applicable to use in airplanes having but a single power unit and, for example, mounted in the body or fuselage of the airplane, or completely exposed.

The wings 2 may be provided with compartments therein for fuel, cargo, or passengers, and with suitable passageways for access thereto from the body, as well as through the wing skin or covering. As an example, I show the spaces 23 in the wings 2 and the passages 24 leading from the fuselage thereto, as well as hatches or the like 25, formed through the under skin of the wings 2 adjacent the leading edges thereof. Any desired arrangement of passages and division of the space within the wings and of hatches or entrances through the wings, may be provided and I do not desire to limit the invention to the illustrated example of one manner of utilizing the space within the supporting surfaces or wings.

An airplane having the major units of the form and type and arranged and mounted, as hereinbefore described and explained, presents a structure in which head resistance is reduced to the minimum, the interior of the body or fuselage is unobstructed by elements of the supporting surface or other structure, in which multiple power units may be employed in such a manner that the units are enclosed within the body of the supporting surface, and one in which a body or fuselage of stream line form may be utilized and the supporting surface mounted thereon without materially interrupting the exterior stream line surface of the body.

The various features of the present invention are applicable to aircraft of the water or hydro aeroplane type in which planing surfaces or pontoons take the place of the landing gear or undercarriage of the land or airplane type illustrated herewith, and hence I do not desire to limit the invention to the airplane type. The invention permits and includes the use of auxiliary supporting surfaces, or in fact, to multiple supporting surfaces, although as explained, it is particularly adapted to the monoplane type.

It is evident that various changes, modifications, and variations might be resorted to without departing from the spirit and scope of my invention, and hence I do not wish to limit myself to the exact disclosures hereof.

Desiring to protect my invention in the broadest manner legally possible, what I claim is:

1. In aircraft, a fuselage comprising an interiorly unobstructed shell, and supporting surfaces mounted thereon by securing the roots thereof to the upper and lower sides of said shell, whereby the interior of the shell is not obstructed by said roots.

2. In airplane construction, a wing comprising longitudinal spars each consisting of upper and lower members spaced apart and provided with trussing therebetween, the root ends of said spar members and trussing upwardly and downwardly flared, respectively.

3. In airplane construction, an internally braced wing including wing spars consisting of upper and lower members having the root ends thereof extended and formed to fit over, across and be secured to upper and lower portions, respectively, of a fuselage frame.

4. In airplane construction, in combination, a fuselage including spaced bulkheads, and internally braced wings including spaced spars each consisting of upper and lower members extended at the root ends and secured to the upper and lower sides respectively, of the adjacent fuselage bulkhead.

5. In an airplane, a fuselage frame comprising spaced, substantially circular bulkheads, and longitudinal members extending over and across said bulkheads, spaced therearound and secured thereto, and wing frames each comprising spaced longitudinal wing spars, and spaced transverse capstrips extending thereover and secured thereto, the root ends of said wing spars extended and flared upwardly and downwardly, respectively, said wing frames mounted on opposite sides, respectively, of said fuselage frame and each secured thereto by attaching the flared root ends of the wing spars to the upper and lower sides of the respective bulkheads adjacent thereto.

6. In airplane construction, a fuselage frame including substantially circular, transverse bulkheads, and a wing frame including longitudinal wing spars consisting of upper and lower members, the root ends of the upper spar members curved upwardly and secured to the upper sides of the adjacent bulkheads, respectively, and the root ends of the lower spar members curved downwardly and secured to the lower sides of said adjacent bulkheads, respectively.

7. In airplane construction, a fuselage including transverse bulkheads, and a wing including longitudinal wing spars consisting of upper and lower members and trussing therebetween, the root ends of said wing spar trussing secured to the fuselage bulkheads adjacent thereto, and the root ends of the upper and lower members of said longitudinal wing spars secured to said bulkheads over and across the secured ends of said trussing, respectively.

8. In airplane construction, a fuselage including a series of spaced transverse bulkheads, a wing including a series of spaced longitudinal wing spars, the said wing spars consisting of longitudinal upper and lower members having trussing extending therebetween and secured thereto, and said wing mounted on said fuselage and attached thereto by securing the root ends of the wing spar trussing and the root ends of the upper and lower members of the wing spars to the sides of the bulkheads adjacent thereto, respectively.

9. In an airplane, a fuselage including a series of spaced transverse bulkheads, and a wing including a series of spaced longitudinal wing spars, said wing spars extended at the root ends thereof and attached to the fuselage bulkheads adjacent thereto, respectively, and tie plates secured over the attached root ends of said wing spars binding the same to said bulkheads, respectively.

10. In an airplane, a fuselage including a series of spaced transverse bulkheads, and wings mounted on said fuselage, extending laterally from opposite sides thereof, the said wings including spaced longitudinal wing spars consisting of upper and lower members, the upper members of the oppositely extending spars of said wings formed by single elements extending from wing tip to wing tip across said fuselage and secured to the bulkheads thereof adjacent thereto, respectively, the lower members of said wing spars terminating at the root ends thereof and secured to the bulkheads adjacent thereto, respectively.

11. In an airplane, a fuselage including a series of spaced transverse bulkheads, and wings mounted on said fuselage extending laterally from opposite sides thereof, each of said wings including a series of spaced longitudinal wing spars consisting of upper and lower members having trussing therebetween, respectively, the upper members of the oppositely extending spars of said wings formed by single one-piece elements secured to the bulkheads of said fuselage, respectively, and extending laterally from opposite sides thereof, the lower members of said oppositely extending wing spars terminating at the root ends thereof and secured to the fuselage bulkheads adjacent thereto, respectively, and the root ends of the trussing of each wing spar attached to the bulkhead adjacent thereto, respectively.

12. In an airplane, a fuselage including spaced transverse bulkheads, and a wing including spaced longitudinal wing spars comprising upper and lower members having rigid bracing therebetween, the root ends of the upper and lower members of each wing spar extended and secured to the upper and lower portions, respectively, of a fuselage bulkhead, and the root ends of the bracing of each wing spar extended upwardly and downwardly and secured to the fuselage bulkhead to which its respective wing spar is secured.

13. In an airplane, in combination, a fuselage including spaced transversely disposed bulkheads, and a wing including spaced longitudinal wing spars, the said wing spars formed of upper and lower members extended at the root ends thereof, and said wing so formed and mounted on said fuselage substantially above the longitudinal axis thereof with the extended root ends of the upper spar members secured to the upper portions of the fuselage bulkheads adjacent thereto, respectively, and the extended root ends of the lower spar members disposed downwardly and secured to the lower portions of the fuselage bulkheads adjacent thereto, respectively.

14. In an airplane, a fuselage including a series of bulkheads, and wings mounted on said fuselage extending laterally from opposite sides thereof, the said wings including longitudinal wing spars consisting of upper and lower members, the upper members of the oppositely extending spars of said wings including continuous elements extending across said fuselage and secured to the bulkheads thereof respectively adjacent thereto, the lower members of said wing spars terminating at the root ends thereof and secured to said fuselage.

15. In an airplane, in combination, a fuselage including a series of spaced transverse bulkheads, a wing including a series of spaced longitudinal wing spars consisting of upper and lower members having trussing secured therebetween, said wing mounted on and supported laterally from said fuselage by securing the root ends of the upper and lower members of the wing spars and the root ends of the wing spar trussing to the fuselage bulkheads respectively adjacent thereto, and a power unit mounted in and enclosed within said wing between a pair of said spaced wing spars, the said power unit supported from the fuselage by said wing spars and trussing therefor.

16. In an airplane, in combination, a fuselage including a series of bulkheads, and a wing including a series of longitudinal wing spars formed of upper and lower members having trussing therebetween, and a power unit mounted on and from said wing spars within and enclosed by said wing, the said wing and power unit therewithin mounted on and supported extending laterally from said fuselage with the root ends of the upper and lower members of said wing spars and the root ends of said spar trussing secured to the fuselage bulkheads respectively adjacent thereto.

DWIGHT W. HUNTINGTON, Jr.